(12) United States Patent
Ossenbrink et al.

(10) Patent No.: US 6,191,352 B1
(45) Date of Patent: Feb. 20, 2001

(54) DEVICE FOR PROJECTING A DEFINED LIGHT BEAM ONTO A PHOTOSENSITIVE AREA

(75) Inventors: Heinz Ossenbrink, Brebbia; Willem Zaaiman, Taino; Claas Helmke, Ranco, all of (IT)

(73) Assignee: European Community (EC) (LU)

( * ) Notice: Under 35 U.S.C. 154(b), the term of this patent shall be extended for 0 days.

(21) Appl. No.: 09/446,985

(22) PCT Filed: Jun. 22, 1998

(86) PCT No.: PCT/EP98/03797

§ 371 Date: Dec. 30, 1999

§ 102(e) Date: Dec. 30, 1999

(87) PCT Pub. No.: WO99/01724

PCT Pub. Date: Jan. 14, 1999

(30) Foreign Application Priority Data

Jun. 30, 1997 (EP) ................................................ 97110643

(51) Int. Cl.⁷ ............................. G01J 1/04; G01R 31/26; G02B 26/08; H01L 31/052
(52) U.S. Cl. ....................... 136/246; 136/259; 136/290; 136/291; 126/600; 126/684; 126/685; 126/686; 126/696; 126/601; 250/203.4; 250/216; 257/432; 359/850; 359/853; 359/864; 359/862; 359/863; 359/857
(58) Field of Search .................................... 136/246, 259, 136/290, 291; 126/600, 684, 685, 686, 696, 601; 250/203.4, 216; 257/432; 359/850, 853, 864, 862, 863, 857

(56) References Cited

U.S. PATENT DOCUMENTS

| | | | | |
|---|---|---|---|---|
| 3,905,352 | * | 9/1975 | Jahn | 126/578 |
| 4,249,516 | * | 2/1981 | Stark | 136/246 |
| 4,284,839 | * | 8/1981 | Johnson | 136/246 |
| 4,641,227 | * | 2/1987 | Kusuhara | 362/231 |
| 5,578,140 | * | 11/1996 | Yogev et al. | 136/246 |

FOREIGN PATENT DOCUMENTS

| | | | |
|---|---|---|---|
| 2497927 | * | 7/1982 | (FR) . |
| 2 497 927 |   | 7/1982 | (FR) . |

* cited by examiner

*Primary Examiner*—Alan Diamond
(74) *Attorney, Agent, or Firm*—Sughrue, Mion, Zinn, Macpeak & Seas, PLLC

(57) ABSTRACT

A device for directing a defined light beam onto a photosensitive area, for testing the performance of a photovoltaic module including said photosensitive area, comprising a support structure (1) which can be turned about a vertical central axis (4) in accordance with the actual azimuthal sun position. Housing (7) receives the photovoltaic module with the photosensitive area (6) of said module in a horizontal position, the housing being located in the lower portion of the support structure. A first mirror (2) which can be tilted about a horizontal axis (3) in order adapt its position continuously to the sun elevation position and to optimize the sun light impact thereon, and a second mirror (5) is fixed to the support structure (1) vertically above the photosensitive area (6) of the module and receives the light beam from the first mirror (2) for reflexion towards said area (6). At least one of said mirrors (2, 5) being associated to a mechanism (8) which allows one to vary the convexity of the mirror in accordance with sun intensity detectors.

5 Claims, 1 Drawing Sheet

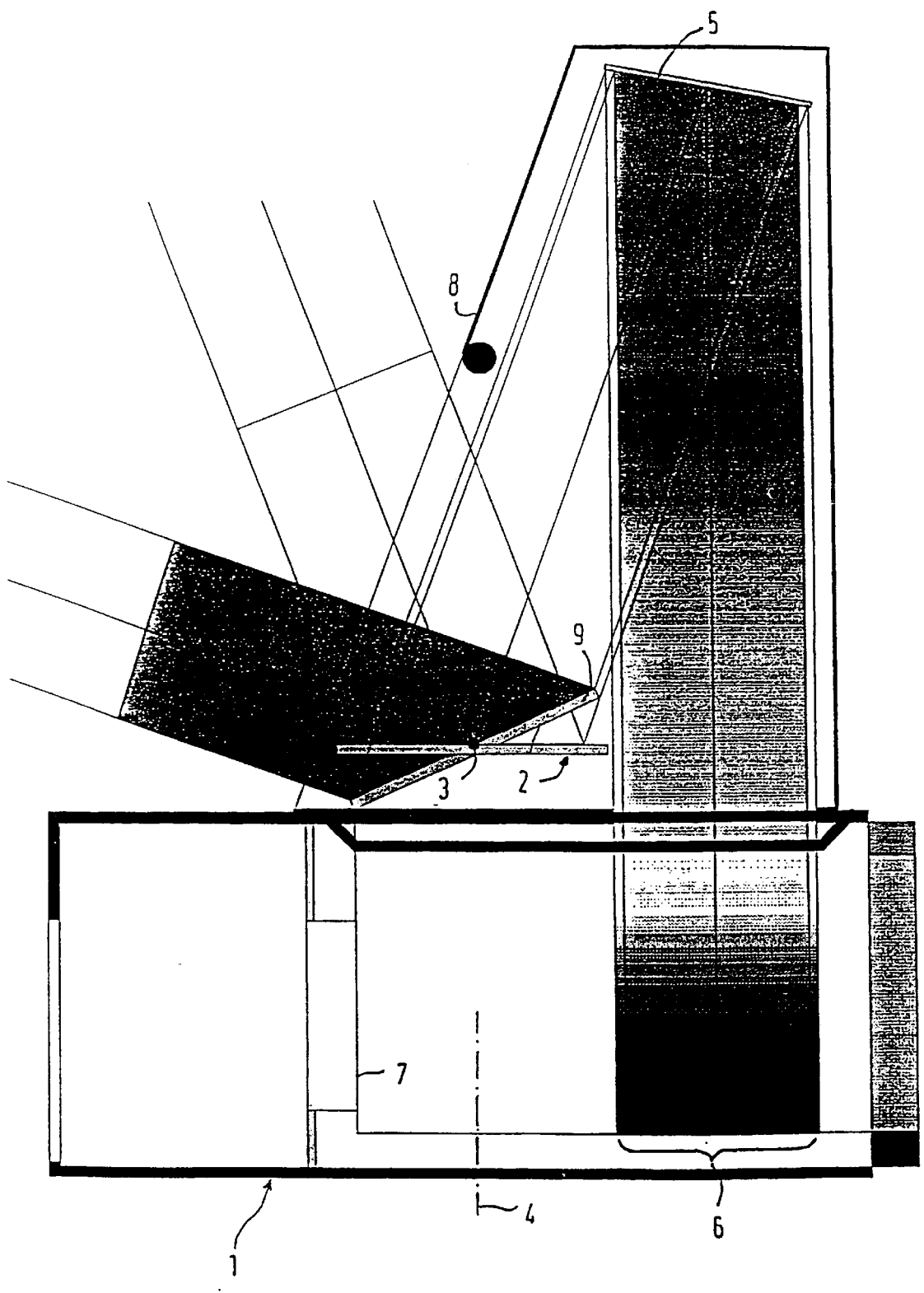

DEVICE FOR PROJECTING A DEFINED LIGHT BEAM ONTO A PHOTOSENSITIVE AREA

BACKGROUND OF THE INVENTION

This invention relates to a device for projecting a defined light beam onto a photosensitive area, particularly for testing the performance of a photovoltaic module.

Performance tests of this kind require a well defined light beam as far as global intensity, local intensity distribution and spectral composition are concerned. For DC photovoltaic modules, pulsed simulated light sources are preferred over natural sunlight due to their well-known and constant light spectrum, their stable intensity over the measuring cycle (about 2 ms), their availability over the entire year and the low and constant temperature level to which the module is subjected during the short term test.

However, some new technology modules such as multi-junction solar panels or AC photovoltaic modules require measuring cycles of longer duration for which high intensity artificial light sources are only available at high costs.

SUMMARY OF THE INVENTION

It is therefore the aim of this invention to conceive an intense light source which is comparatively cheap, which supplies a uniform and defined light intensity on a large area of up to 4 $m^2$ during long lasting test periods and which allows one to keep the module under test at a controlled low temperature.

This aim is achieved according to the invention by the device as defined in claim 1. Preferred embodiments of this device are characterized in the dependent claims.

BRIEF DESCRIPTION OF THE DRAWING

The invention will now be described in more detail with reference to the drawing which shows schematically a device in accordance with the invention.

DESCRIPTION OF THE PREFERRED EMBODIMENT

This device uses as the primary light source the sun but avoids the drawbacks of this choice (variable spectrum and intensity with daytime and annual seasons) by providing adequate control mechanisms.

In the drawing a structure 1 is shown which can be turned about a vertical axis 4 by a motor (not shown) in accordance with the relative sun movement with respect to the location of the device. This structure 1 supports two mirrors:

A first mirror 2 is mounted in order to receive the incident sunlight. It can be tilted by a motor (not shown) about a horizontal axis 3 by control means in order to permit a continuous matching with the sun elevation angle. It is shown in two different positions.

A second mirror 5 is securely mounted above a horizontal plane which constitutes the photosensitive area 6 where the module is to be tested. It receives the light reflected by the first mirror and is fixed and oriented to direct the incident light vertically down to area 6.

The photosensitive area is located inside a housing incorporating a drawer for holding the module to be tested. This housing is provided with temperature stabilisation means which ensure a defined low temperature of the area 6 during the entire test cycles. These means are not shown because they are conventional.

A roman blind 8 protects the structure against diffused daylight which could falsify the test by contributing to the light irradiation of the area 6. This blind defines the aperture geometry of the first mirror 2.

An essential feature of the present invention is the regulation of the light intensity to which the area 6 is subjected. In fact the intensity of sunlight varies with the weather conditions and the daily and seasonal elevation angle evolution. To this end one of the mirrors, preferably the first mirror 2 is mounted on a mechanism which is able to vary the convexity or concavity of the mirror surface. The other mirror is preferably a plane mirror, but it can be useful to modify the convexity of both mirrors.

Such a mechanism is known and consists in a first embodiment of a gastight chamber 9 of circular cylindrical shape. One of its circular outer surfaces is resilient and constitutes or bears the mirror. This surface can be made more or less concave or convex in accordance with the pressure of the gas supplied to the chamber. This pressure is preferably a vacuum pressure, but it can also be high pressure. The gas supply means are not shown because they are conventional.

In another embodiment this mechanism consists of a plurality of pushrods each associated to a subarea of the mirror and to individual electromechanical actuators.

The spectral light composition as supplied by the sunlight can easily be adapted to the needs by interposing adequate filters in the vertical path of the light beam. Thus for example monochromatic light of a desired wavelength can be used for the tests in order to study the performance of the module as a function of wavelength.

All the movements necessary to adjust the device to the elevation and azimuthal angle of the sun and to regulate the light intensity by means of the convexity of the variable mirror are controlled according to the users commands by a microprocessor which receives measuring signals from adequate detectors.

A prototype of the device has an overall height of about 10 m and mirror surfaces or beam cross sections of about 4 $m^2$.

The device according to the invention supplies test light during several hours per day of sunshine and over the entire year. If in summer the intensity of the sunlight is high the convexity control mechanism enlarges the beam, thus making only a portion of the incident beam fall on the area 6. On the contrary in winter or at cloudy weather the beam section is reduced by the mechanism in order to concentrate all the incident light energy on said area or even only on a central portion thereof which then is the only test zone. Under all conditions the energy distribution is uniform over the respective test area because the light reflexion is practically afocal, the focal length of the variable mirror being in any case long compared to the dimensions of the device.

What is claimed is:

1. A device for directing a defined light beam onto a photosensitive area, for testing the performance of a photovoltaic module including said photosensitive area, comprising a support structure (1) which can be turned about a vertical central axis (4) in accordance with the actual azimuthal sun position, a housing (7) receiving the photovoltaic module with the photosensitive area (6) of said module in a horizontal position, the housing being located in the lower portion of the support structure, a first mirror (2) which can be tilted about a horizontal axis (3) in order to adapt its position continuously to the sun elevation position and to optimize the sun light impact thereon, and a second mirror (5) fixed to the support structure (1) vertically above the photosensitive area (6) of the module and receiving the light beam from the first mirror (2) for reflexion towards said area (6), at least one of said mirrors (2, 5) being associated to a mechanism (8) which allows one to vary the convexity of the mirror in accordance with sun intensity detectors.

2. A device according to claim 1, characterized in that the housing (7) is provided with temperature stabilisation means.

3. A device according to claim 1, characterized in that a microprocessor receives signals from the sun intensity detectors and supplies controls to the convexity varying mechanism.

4. A device according to claim 1, characterized in that the first mirror (2) is associated to the convexity varying mechanism whereas the second mirror (5) is plane.

5. A device according to claim 1, characterized in that the second mirror (5) is associated to the convexity varying mechanism whereas the first mirror (2) is plane.

* * * * *